(12) United States Patent
Fujiwara

(10) Patent No.: US 7,868,929 B2
(45) Date of Patent: Jan. 11, 2011

(54) WHITE BALANCE CORRECTING METHOD AND IMAGE-PICKUP APPARATUS

(75) Inventor: Shinya Fujiwara, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 601 days.

(21) Appl. No.: 11/859,195

(22) Filed: Sep. 21, 2007

(65) Prior Publication Data

US 2008/0252749 A1    Oct. 16, 2008

(30) Foreign Application Priority Data

Sep. 22, 2006    (JP)    ............................. 2006-257803

(51) Int. Cl.
*H04N 9/73*    (2006.01)

(52) U.S. Cl. .................. 348/223.1; 348/224.1; 348/371

(58) Field of Classification Search .............. 348/223.1, 348/371, 224.1

See application file for complete search history.

(56) References Cited

U.S. PATENT DOCUMENTS 5,001,552 A * 3/1991 Okino ..................... 348/224.1

FOREIGN PATENT DOCUMENTS

| JP | 2003-283918 A | 10/2003 |
|----|---------------|---------|
| JP | 2003-309854 A | 10/2003 |
| JP | 2003309854 A * | 10/2003 |

* cited by examiner

*Primary Examiner*—Jason Chan
*Assistant Examiner*—Usman Khan
(74) *Attorney, Agent, or Firm*—Sughrue Mion, PLLC

(57) ABSTRACT

The present invention provides a white balance correcting method and image-pickup apparatus which are able to perform white balance correction on a main subject even if mixed light of flash light and ambient light is radiated on the main subject, as the method and the apparatus are adapted to correctly predict the amount of flash reached, which is the amount of light reached a main subject in the main emission, for performing white balance correction according to the predicted amount of light reached.

10 Claims, 13 Drawing Sheets

WHITE BALANCE CORRECTING METHOD AND IMAGE-PICKUP APPARATUS

BACKGROUND OF THE INVENTION

1. Field of the Invention

The present invention relates to a white balance correcting method and image-pickup apparatus, and more specifically to a technique for performing optimal white balance correction in flash photography.

2. Description of the Related Art

The flash-photographed image (hereinafter referred to as "main emitted image") has different illuminating light sources for a main subject and a background (a main subject=ambient light+flash light, a background=ambient light). That hinders appropriate white balance correction.

The ambient light illuminating the main subject in flash photographing has stronger effect on the whole image in recent years as digital cameras have had higher sensitivity. If white balance correction is performed with a white balance gain (hereinafter referred to as "flash gain") for each color of R, G, B, which are preset in correspondence with light source colors of the flash, with those digital cameras, colors on the main subject are badly affected.

For the purpose of solving the problems, an image processing apparatus described in Japanese Patent Application Laid-Open No. 2003-283918 is adapted to obtain a ratio of the amount of flash light to outside light to control white balance of an image that is flash-photographed based on the amount of light ratio.

A digital camera described in Japanese Patent Application Laid-Open No. 2003-309854 is adapted to obtain the final white balance gain by causing a flash to emit previously (pre-emit) to the main photographing, comparing a brightness value of a subject of a pre-emitted image obtained in the pre-emitting and a brightness value of a subject of a non-pre-emitted image obtained in the non-pre-emitting, obtaining the amount of the brightness value of a subject changed by the pre-emission and effect of the pre-emission on the brightness value of a subject, and performing weighting-adding on the flash gain and the white balance gain for the ambient light (stationary light) based on both of the values.

SUMMARY OF THE INVENTION

The image processing apparatus described in Japanese Patent Application Laid-Open No. 2003-283918 has a problem in that it cannot perform preferable white balance correction, as a proportion of flash light radiated on the main subject changes according to a distance (a high proportion of flash light is radiated for a short distance, and a low proportion of flash light is radiated for a long distance) even if the same amount of flash is emitted.

The digital camera described in Japanese Patent Application Laid-Open No. 2003-309854 also has a problem in that it cannot perform preferable white balance correction for the reasons below: Although the digital camera decides a weighing factor for performing weighing-adding on the flash gain and the white balance gain for stationary light based on both of the brightness values on a subject for the pre-emitted image and the non-pre-emitted image, the relationship of 'amount of pre-emission reached:outside light=present amount of pre-emission reached:outside light' is not established here because the amount of emission in a main emission differs from the amount of emission in the pre-emission. As a result, the final white balance gain calculated by the digital camera described in Japanese Patent Application Laid-Open No. 2003-309854 has low accuracy.

The present invention has been made in view of such circumstances and it is an object to provide a white balance correcting method and image-pickup apparatus which are able to perform white balance correction on a main subject even if mixed light of flash light and ambient light is radiated on the main subject, as the method and the apparatus are adapted to correctly predict the amount of flash reached, which is the amount of light reached a main subject in the main emission, for performing white balance correction according to the predicted amount of light reached.

In order to achieve the abovementioned objects, a white balance correcting method of a first aspect of the present invention includes a step of causing a flash emission device to perform pre-emission with a predetermined amount of emission prior to flash photographing and capturing a pre-emitted image picked up in the pre-emission; a step of capturing a non-emitted image picked up in the non-emission prior to the flash photographing; a step of calculating a brightness value given by the amount of emission in the pre-emission to a main subject by comparing the pre-emitted image and the non-emitted image; a step of calculating an amount of flash reached, which indicates a proportion of the brightness value given by the amount of emission in the pre-emission to the main subject, to a target brightness value based on the brightness value given by the calculated amount of emission in the pre-emission to the main subject; a step of calculating an amount of emission in the main emission required for photographing the main subject at the target brightness value based on the captured pre-emitted image and non-emitted image; a step of causing the flash emission device to perform the main emission by the calculated amount of emission in the flash photographing and capturing the main emitted image; a step of calculating a predicted amount of light reached, which indicates a proportion of the brightness value given by the amount of emission in the main emission to the main subject, to a target brightness value based on the calculated amount of flash reached in the pre-emission and a ratio of the calculated amount of emission in the main emission to the amount of emission in the pre-emission; and a step of performing white balance correction on the main emitted image obtained in the flash photographing based on the calculated predicted amount of light reached.

That is, the brightness value given by the amount of emission in the pre-emission to the main subject is calculated based on the pre-emitted image and the non-emitted image captured before the flash photographing. The brightness value can be obtained from a difference between the subject brightness values for both images. The amount of flash reached in the pre-emission is calculated based on the brightness value given by the amount of emission in the pre-emission to the main subject. The amount of flash reached can be obtained by calculating a ratio of the calculated brightness value to the target brightness value.

On the other hand, the amount of emission in the main emission required for photographing the main subject at the target brightness is calculated based on the captured pre-emitted image and non-emitted image. A method for calculating the amount of emission in the main emission is; obtaining the brightness value to be compensated in the main emission by subtracting the brightness value of the non-emitted image from the target brightness value, obtaining a factor for the amount of emission in the pre-emission by dividing the brightness value by a brightness value given by the calculated amount of emission in the pre-emission to the main subject, obtaining the amount of main emission by multiplying the calculated factor to the amount of emission in the pre-emission, performing the flash photographing by the amount of emission in the main emission calculated in this manner and capturing the main emitted image.

Based on the relation of 'the amount of emission in the pre-emission:the amount of flash reached=the amount of emission of the main emission:the predicted amount of light reached", the predicted amount of light reached can be correctly calculated.

When the white balance correction is performed with the predicted amount of light reached calculated in the above manner that indicates a proportion of the brightness value given by the amount of emission in the main emission to the main subject to the target brightness value, an appropriate white balance correction can be realized.

As described in a second aspect, the white balance correcting method described in the first aspect is such that the step of performing white balance correction includes a step of calculating a white balance gain that is obtained by performing weighing-adding on a first white balance gain decided for each color of R, G, B based on the main emitted image obtained in the flash photographing or ambient light around the subject and a second white balance gain preset for each color of R, G, B corresponding to the light source color of the flash according to the calculated predicted amount of light reached; and a step for performing gain correction on R, G, B signals, which represent the main emitted image obtained in the flash photographing based on the calculated white balance gain. That is, the method is adapted to bring the white balance gain close to the second white balance gain because the flash light occupies the main part of the illuminating light on the main subject as the proportion of the predicted amount of light reached increases, and, in contrast, bring the white balance gain close to the first white balance gain because the ambient light occupies the main part of the illuminating light on the main subject as the proportion of the predicted amount of light reached decreases.

As described in a third aspect, the white balance correcting method described in the first aspect includes a step of detecting a face from each of the non-emitted image and the pre-emitted image, wherein the step of calculating a brightness value that is given by the amount of emission in the pre-emission to the main subject calculates the brightness value by comparing a non-emitted image and a pre-emitted image in a face area including a detected face when the face is detected in the non-emitted image or the pre-emitted image.

That is, the method can appropriately perform white balance correction particularly on a face because it is adapted to calculate the brightness value given by the amount of emission in the pre-emission to the main subject by using the non-emitted image and the pre-emitted image in the face area.

As described in a fourth aspect, the white balance correcting method described in the second aspect includes a step of detecting the brightness value of the main emitted image obtained in the flash photographing, wherein the step of calculating the white balance gain calculates the white balance gain by increasing the weight of the second white balance gain to be bigger than the weight decided in accordance with the calculated predicted amount of light reached when the brightness value of the detected main emitted image is bigger than the target brightness value; and calculates the white balance gain by decreasing the weight of the second white balance gain to be smaller than the weight decided in accordance with the calculated predicted amount of light reached when the brightness value of the detected main emitted image is smaller than the target brightness value.

That is, the method is adapted to calculate an appropriate white balance gain even if the brightness value of the main emitted image deviates from the target brightness value when the amount of emission in the main emission is inconsistent. The method is adapted to calculate the final white balance gain by increasing the weight of the second white balance gain when the brightness value of the main emitted image is bigger than the target brightness value, as the actual amount of light reached is bigger than the calculated predicted amount of light reached; and, in contrast, by decreasing the weight of the second white balance gain when the brightness of the main emitted image is smaller than the target brightness value, as the actual amount of light reached is smaller than the calculated predicted amount of light reached.

As described in a fifth aspect, the white balance correcting method described in the second aspect includes a step of detecting the brightness value of the main emitted image obtained in the flash photographing and a step of detecting a light source type of the ambient light around the subject, wherein the step of calculating the white balance gain calculates the white balance gain by decreasing the weight of the second white balance gain to be smaller than the weight decided in accordance with the calculated predicted amount of light reached when the detected light source is a fluorescent lamp and the brightness value of the detected main emitted image is bigger than the target brightness value; and calculates the white balance gain by increasing the weight of the second white balance gain to be bigger than the weight decided in accordance with the calculated predicted amount of light reached when the detected brightness value of the main emitted image is smaller than the target brightness value.

That is, flicker of the fluorescent lamp may affect the image at the moment of flash metering. Therefore, if the light source of the ambient light is determined as a fluorescent lamp and the brightness value of the main emitted image is bigger than the target brightness value (as the amount of the ambient light is evaluated small, the amount of main emission is set big), the main emitted image gets bigger affection from the ambient light (the fluorescent lamp) than it does at the moment of flash metering. In such a case, the method is adapted to decrease the weight of the second white balance gain to be smaller. When the brightness value of the main emitted image is smaller than the target brightness value (as the amount of the ambient light is evaluated big, the amount of main emission is set small), the method is adapted to increase the weight of the second white balance gain to be bigger.

As described in a sixth aspect, the white balance correcting method described in the first aspect is such that the step of capturing the main emitted image captures the main emitted image by limiting the amount of emission from the flash to the maximum amount of emission in flash photographing when the calculated amount of emission exceeds the maximum amount of emission from the flash emission device; and the step of calculating the predicted amount of light reached calculates the predicted amount of light reached that indicates a proportion of the brightness value given by the maximum amount of emission to the main subject to the predicted brightness value or the measured brightness value by using the predicted brightness value or the measured brightness value instead of the target brightness value when the calculated amount of emission in the main emission exceeds the maximum amount of emission from the flash emission device, wherein the predicted brightness value is predicted from an excess amount of emission that is the calculated amount of emission in the main emission exceeds the maximum amount of emission, and the measured brightness value is calculated from the main emitted image.

That is, the brightness value of the main emitted image may not reach the target brightness value due to the effect of the maximum amount of emission from the flash emission device. In such a case, the method is adapted to clip the amount of emission in the main emission to the maximum amount of emission, obtain the predicted measured brightness value of the main emitted image or the measured brightness value calculated from the main emitted image instead of the target brightness value, and calculate the predicted amount of light reached from a ratio of the amount of flash reached in the pre-emission against the predicted brightness value or the measured brightness value, and a ratio of the maximum amount of emission to the amounts of emission in the pre-emission.

Image-pickup apparatus described in a seventh aspect includes a flash emission device; an image-pickup device which picks up an image of a subject in non-emission and pre-emission and main emission; an image capturing device which causes the flash emission device to perform pre-emission with a predetermined amount of emission prior to flash photographing and captures a pre-emitted image picked up in the pre-emission and also captures a non-emitted image picked up in the non-emission; a brightness value calculating device which calculates brightness value given by the amount of emission in the pre-emission to the main subject by comparing the captured pre-emitted image and the non-emitted image; an amount of flash reached calculating device which calculates the amount of flash reached, which indicates a proportion of the brightness value given by the amount of emission in the pre-emission to the main subject, to a target brightness value based on the brightness value given by the calculated amount of emission in the pre-emission to the main subject; an amount of emission calculating device which calculates the amount of emission in the main emission required for photographing the main subject at the target brightness value based on the captured pre-emitted image and non-emitted image; a flash metering device which adjusts the amount of emission from the flash device to bring the amount of emission to the amount of emission in the main emission calculated in the flash photographing; a predicted amount of light reached calculating device which calculates a predicted amount of light reached, which indicates a proportion of the brightness value given by the amount of emission in the main emission to the main subject, to a target brightness value based on the calculated amount of flash reached in the pre-emission and a ratio of the calculated amount of emission in the main emission to the amount of emission in the pre-emission; and a white balance correction device which performs white balance correction on the main emitted image obtained in the flash photographing based on the calculated predicted amount of light reached.

As described in an eighth aspect, the image-pickup apparatus described in the seventh aspect is such that the white balance correction device includes a white balance gain calculating device which calculates a white balance gain that is obtained by performing weighing-adding on a first white balance gain decided for each color of R, G, B based on the main emitted image obtained in the flash photographing or ambient light around the subject and a second white balance gain preset for each color of R, G, B corresponding to the light source color of the flash according to the calculated predicted amount of light reached, and a gain correction device which performs gain correction on R, G, B signals, which represent the main emitted image obtained in the flash photographing based on the white balance gain calculated by the white balance gain calculating device.

As described in a ninth aspect, the image-pickup apparatus described in the seventh aspect includes a face detecting device which detects a face from the non-emitted image or the pre-emitted image, wherein the brightness value calculating device calculates the brightness value that is given by the amount of emission in the pre-emission to the main subject by comparing a pre-emitted image and a non-emitted image in a face area including a detected face when the face is detected by the face detecting device.

As described in a tenth aspect, the image-pickup apparatus described in the eighth aspect includes a brightness value detecting device which detects the brightness value of the main emitted image obtained in the flash photographing, wherein the white balance gain calculating device calculates the white balance gain by increasing the weight of the second white balance gain to be bigger than the weight decided in accordance with the calculated predicted amount of light reached when the brightness value of the detected main emitted image is bigger than the target brightness value, and calculates the white balance gain by decreasing the weight of the second white balance gain to be smaller than the weight decided in accordance with the calculated predicted amount of light reached when the brightness value of the detected main emitted image is smaller than the target brightness value.

As described in an eleventh aspect, the image-pickup apparatus described in the eighth aspect includes a brightness value detecting device which detects the brightness value of the main emitted image obtained in the flash photographing and a light source type detecting device which detects a light source type of the ambient light around the subject, wherein the white balance gain calculating device calculates the white balance gain by decreasing the weight of the second white balance gain to be smaller than the weight decided in accordance with the calculated predicted amount of light reached when the detected light source is a fluorescent lamp and the brightness value of the detected main emitted image is bigger than the target brightness value; and calculates the white balance gain by increasing the weight of the second white balance gain to be bigger than the weight decided in accordance with the calculated predicted amount of light reached when the detected brightness value of the main emitted image is smaller than the target brightness value.

As described in the twelfth aspect, the image-pickup apparatus described in the seventh aspect is such that the flash metering device adjusts the amount of flash emission to bring the amount of flash emission to the maximum amount of emission in the main emission when the amount of emission calculated by the amount of emission calculating device exceeds the maximum amount of emission from the flash emission device, and the predicted amount of light reached calculating device calculates the predicted amount of light reached, which indicates a proportion of the brightness value given by the maximum amount of emission to the main subject, to the predicted brightness value or the measured brightness value by using the predicted brightness value or the measured brightness value instead of the target brightness value when the amount of emission calculated by the amount of emission calculating device exceeds the maximum amount of emission from the flash emission device, wherein the predicted brightness value is predicted from an excess amount of emission that is the calculated amount of emission in the main emission exceeds the maximum amount of emission, and the measured brightness value is calculated from the main emitted image.

As the present invention is adapted to be able to correctly predict the amount of flash reached, which is the amount of flash reached on a main subject in the main emission, and perform white balance correction according to the predicted amount of light reached, the present invention can appropriately perform white balance correction on the main subject even if a mixed light of flash light and ambient light is radiated on the main subject.

DETAILED DESCRIPTION OF THE PREFERRED EMBODIMENTS

Preferred embodiments of the white balance correcting method and the image pick-up apparatus according to the present invention will be described with reference to the attached drawings.

[Configuration of Image Pick-Up Apparatus]

Figure 1:
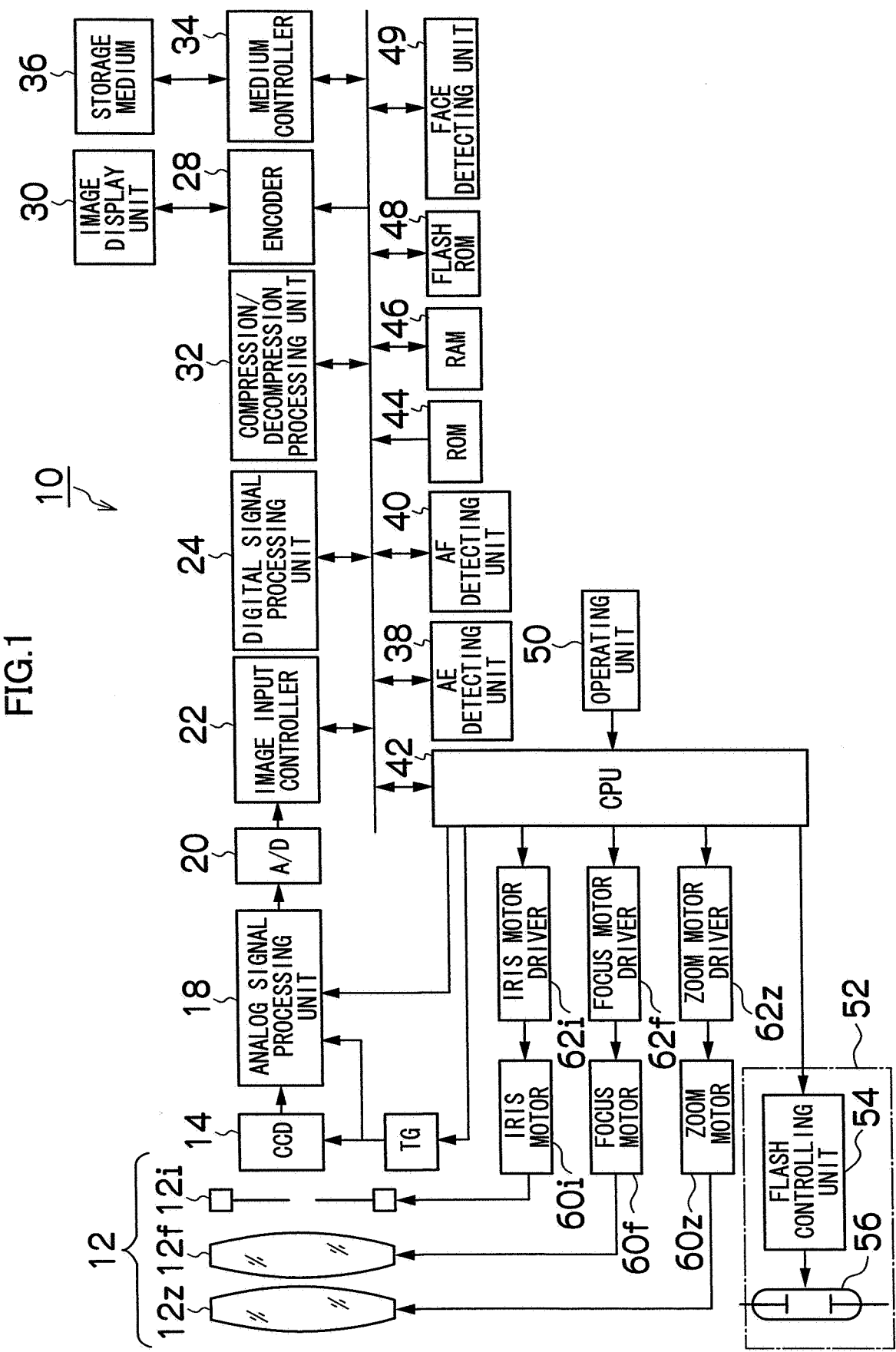
FIG. 1 is a block diagram showing an embodiment of an inner configuration of an image pick-up apparatus (digital camera) according to the present invention.

FIG. 1 is a block diagram showing an embodiment of an inner configuration of an image pick-up apparatus (digital camera) 10 according to the present invention.

As shown in the figure, the digital camera 10 of the embodiment includes a photographing optical system 12, an image sensor 14 made of a solid image pickup device such as a CCD (hereinafter referred to as "CCD"), a timing generator (TG) 16, an analog signal processing unit 18, an A/D converter 20, an image input controller 22, a digital signal processing unit 24, an encoder 28, an image display unit 30, a compression/decompression unit 32, a medium controller 34, a storage medium 36, an auto-exposure (AE) detecting unit 38, an auto-focus (AF) detecting unit 40, a central processing device (CPU) 42, a ROM 44, a RAM 46, a flash ROM 48, a face detecting unit 49, an operating unit 50, and a flash device 52.

The operating unit 50 includes a shutter button, a power switch, a photographing/reproducing mode selection switch, a back switch, a menu/OK switch, and multi-function arrow keys. The shutter button is a two stroke button with a switch S1 for preparing the AF, AE and the like as the button is pressed halfway down, and a switch S2 for capturing an image as the button is pressed all the way down.

The CPU 42 controls over the operations of the entire digital camera 10. The CPU 42 controls each unit of the digital camera 10 along predetermined programs based on the input from the operating unit 50.

The ROM 44 stores not only the program executed by the CPU 42 but also data required for various types of control such as a program chart and the like. The CPU 42 decompresses the program stored in the ROM 44 onto the RAM 46 and executes various types of processing as using the RAM 46 as a working memory. The flash ROM 48 stores various types of setting information and the like relating to the operations of the digital camera 10 such as user setting information.

The photographing optical system 12 includes a zoom lens 12$z$, a focus lens 12$f$, a diaphragm (for example, an iris diaphragm) 12$i$, which operate as they are driven by a zoom motor 60$z$, a focus motor 60$f$, an iris motor 60$i$, respectively. That is, the zoom lens 12$z$ changes a focal length by moving back and forth on a photographing axis as driven by the zoom motor 60$z$. The focus lens 12$f$ changes an image location by moving back and forth on the photographing axis as driven by the focus motor 60$f$. The diaphragm 12$i$ changes an f/number by serially or gradually changing the aperture value as driven by the iris motor 60$i$. The CPU 42 controls the operation of the zoom lens 12$z$, the focus lens 12$f$ and the diaphragm 12$i$ by controlling the zoom motor 60$z$, the focus motor 60$f$, and the iris motor 60$i$ via the zoom motor driver 62$z$, the focus motor driver 62$f$, the iris motor driver 62$i$.

The CCD 14 is made of a color CCD with a predetermined color filter arrangement (for example, a honeycomb arrangement). The light incident on a receiving surface of the CCD 14 via the photographing optical system 12 is converted into the signal charge by the amount appropriate for the amount of incident light by each of the photodiodes arranged on the receiving surface. Then, the signal charge accumulated in each of the photodiodes is read out according to a timing signal added by the timing generator (TG) 16 and output from the CCD 14 as voltage signals (image signals) in order.

The CCD 14 has a shutter gate and a shutter drain so as to emit the signal charge accumulated in each of the photodiodes to the shutter drain by applying a shutter gate pulse to the shutter gate. The CPU 42 controls a charge accumulating time for signal charge accumulated in each of the photo diodes by controlling application of the shutter gate pulse to the shutter gate via the TG16 (i.e., a shutter speed by a digital shutter).

The analog signal processing unit 18 includes a CDS circuit and an analog amplifier. The CDS circuit performs correlation double sampling on a CCD output signal based on a CDS pulse applied from the TG 16. The analog amplifier amplifies an image signal output from the CDS circuit by a gain set according to photographing sensitivity applied from the CPU 42. The A/D converter 20 converts an analog image signal output from the analog signal processing unit 18 into a digital image signal.

The image input controller 22 includes buffer memory with a predetermined capacity for accumulating image signals output from the A/D converter 20 for one frame and store the image signals in the RAM 46.

Figure 2:
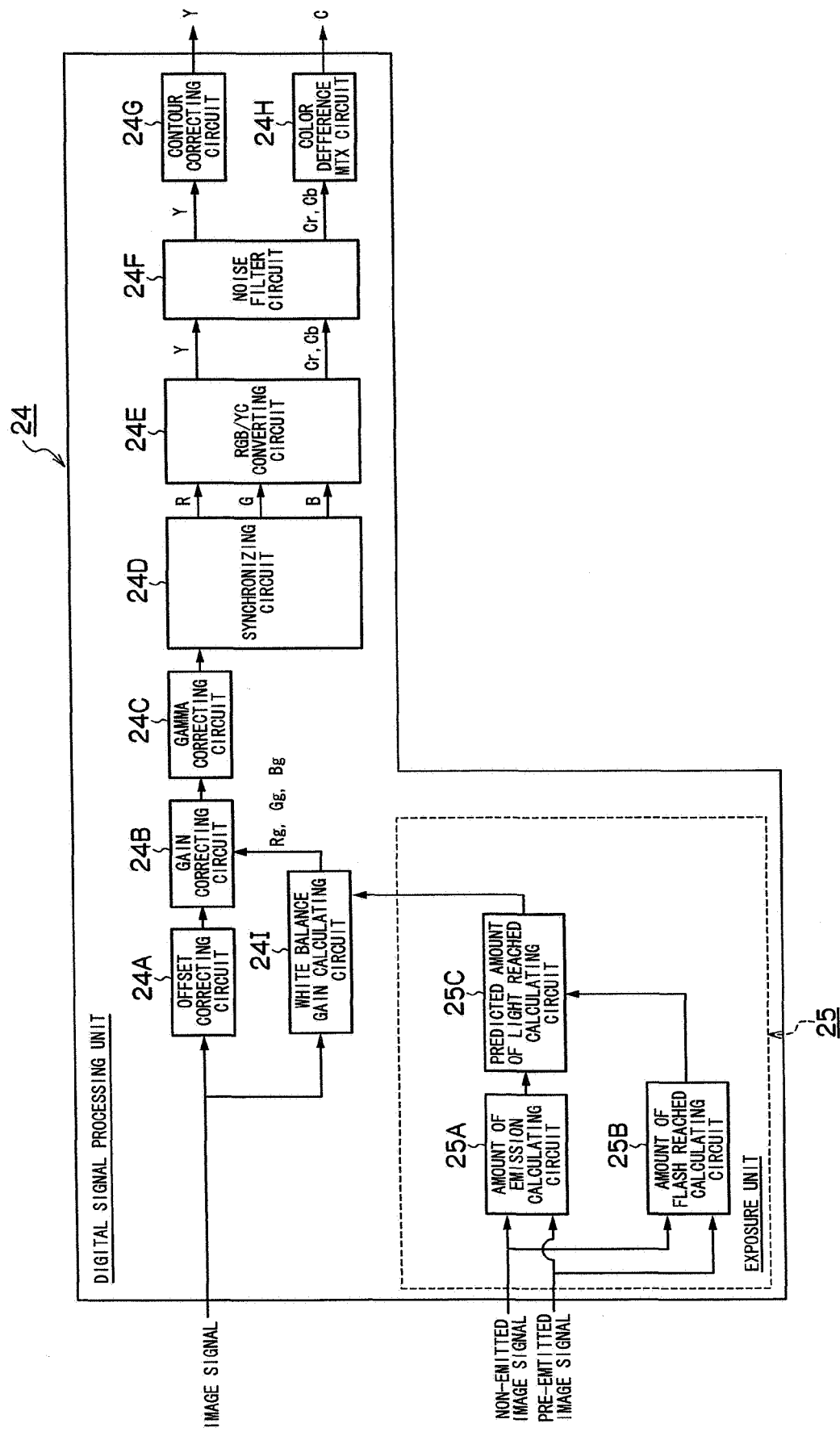
FIG. 2 is a block diagram showing a first embodiment of the digital signal processing unit shown in FIG. 1.

FIG. 2 is a block diagram showing configuration of the digital signal processing unit 24.

The digital signal processing unit 24 includes an offset correcting circuit 24A, a gain correcting circuit 24B, a gamma correcting circuit 24C, a synchronizing circuit 24D, an RGB/YC converting circuit 24E, a noise filter circuit 24F, a contour correcting circuit 24G, and a color difference matrix circuit 24H, a white balance (WB) gain correcting circuit I, and a metering unit 25. The digital signal processing unit 24 processes image signals (RAW data for R, G, B) stored in the RAM 46 according to an order from the CPU 42 and generates a YC signal including a brightness signal and a color difference signal.

That is, the RAW data for R, G and B (R, G and B signals) is captured in order of RGBGRGBG, for example, according to the color filter arrangement of the CCD 14. The R, G and B signals are applied to the offset correcting circuit 24A, subjected to offset processing for making the black levels of the R, G and B signals, and then applied to the gain correcting circuit 24B.

To the other inputs of the gain correcting circuit 24B, WB gains Rg, Gg, Bg for respective R, G and B signals decided by the WB gain calculating circuit 24I are applied. The gain correcting circuit 24B performs WB correction by performing gain correction on the R, G and B signals by using the WB gains Rg, Gg, Bg corresponding to the R, G and B signals to be input. The WB gain calculating circuit 24I and the metering unit 25 will be described in detail later.

The R, G and B signals subjected to the WB correction are applied to the gamma correcting circuit 24C. The gamma correcting circuit 24C performs gray scale conversion (gamma correction) on the R, G and B signals to be input, and applies the gamma corrected R, G and B signals to the synchronizing circuit 24D. The synchronizing circuit 24D converts the R, G and B signals into a synchronized form by interpolating a spatial gap among the R, G and B signals due to color filter arrangement of a single-panel CCD, and outputs the synchronized R, G and B signals to the RGB/YC converting circuit 24E.

The RGB/YC converting circuit 24E converts the R, G and B signals into the brightness signal Y and a color signal Cr and Cb, and outputs the brightness signal Y to a contour correcting circuit 170 via the noise filter circuit 24F, while outputting the color difference signals Cr, Cb to a color difference matrix circuit 24H via the noise filter circuit 24F. The contour correcting circuit 24G processes the contour part of the brightness signal Y (a part where the brightness largely changes) to highlight the part. The color difference matrix circuit 24H realizes good color reproducibility by performing required matrix conversion on the color difference signals Cr and Cb.

For the purpose of displaying a through image (live image) on the image display unit 30, the images are serially picked up by the CCD 14 and the obtained image signals are serially processed into YC signals. The generated YC signals are applied to the encoder 28 via the RAM 46, converted into a signal form for display and output to the image display unit 30. As a result, the through image is displayed on the image display unit 30.

For the purpose of recording an image, the images are picked up by the CCD 14 according to an image pickup instruction from the shutter button, and the obtained image signals are processed into YC signals. The generated YC signals are applied to the compression/decompression unit 32 and converted into certain compressed image data (for example, JPEG) and stored in the storage medium 36 via the medium controller 34.

The compressed image data stored in the storage medium 36 is read out from the storage medium 36 according to a reproducing instruction and converted into uncompressed YC signals at the compression/decompression unit 32 and output to the image display unit 30 via the encoder 28. As a result, the image recorded in the storage medium 36 is reproduced on the image display unit 30.

The AE detecting unit 38 calculates a physical amount required for AE control from the input image signal according to the instruction from the CPU 42. For example, a screen as a physical amount required for the AE control is divided into a plurality of areas (for example, 8×8) and an integrated value for each of R, G and B image signals is calculated for each of the divided areas. The CPU 42 obtains an EV value by detecting the brightness of the subject based on the integrated value obtained from the AE detecting unit 38, and f/number at the time when an image signal is obtained, and a shutter speed. Then the CPU 42 sets an exposure according to the program chart based on the obtained EV value.

The AF detecting unit 40 calculates a physical amount required for AF control from the input image signal according to the instruction from the CPU 42. The digital camera 10 of the embodiment is adapted to perform AF control with a contrast among images. The AF detecting unit 40 calculates the AF evaluating value, which indicates sharpness of the image from the input image signals. The CPU 42 controls the movement of the focus lens 12 by driving the focus motor 60$f$ via the focus motor driver 62$f$ so that the AF evaluating value calculated at the AF detecting unit 40 be maximum.

The face detecting unit 49 includes an image matching circuit and a face image template. The face detecting unit 49 detects a face of a subject (person) included in photographed images and outputs information on a position and a size of the face to the CPU 42.

That is, the image matching circuit in the face detecting unit 49 examines correlation between the preset biggest object area for detecting a face area and the face image template, while inching the biggest object area in the image. When the correlation score exceeds the preset threshold, the image matching circuit recognizes the object area as a face area. Then, the image matching circuit slightly decreases the object area and examines the correlation between the object area and the face image template again. That operation is repeated until the minimum detecting area that is desired to be detected is reached to obtain a face area. The information on the face area obtained in this manner (information indicating the size and the position of the face area) is output to the CPU 42.

The information on the face area detected in such a manner is used for the AF control, AE control and the like. The face detecting method is not limited to those described above and a known method can be used such as a face detecting method using edge detection or a shape pattern detection or a face detecting method by a color detection or a skin color detection.

The flash device 52 includes a flash emission unit 54 including a xenon tube; and a flash control unit 56 for performing control of the amount of flash emission (emitting time) for emitting from the flash emission unit 54 in response to an instruction to emit or an instruction to stop emission from the CPU 42 or charge control of the main capacitor (not shown).

The flash device 52 operates according to the flash mode selected from the auto flash mode that automatically emits light under a low brightness, a forced emitting flash mode, a red-eye reducing flash mode, a flash emission forbidding mode and the like.

The white balance correcting method according to the present invention, specifically the white balance correcting method in flash photographing will be described below.

First Embodiment

Figure 3:
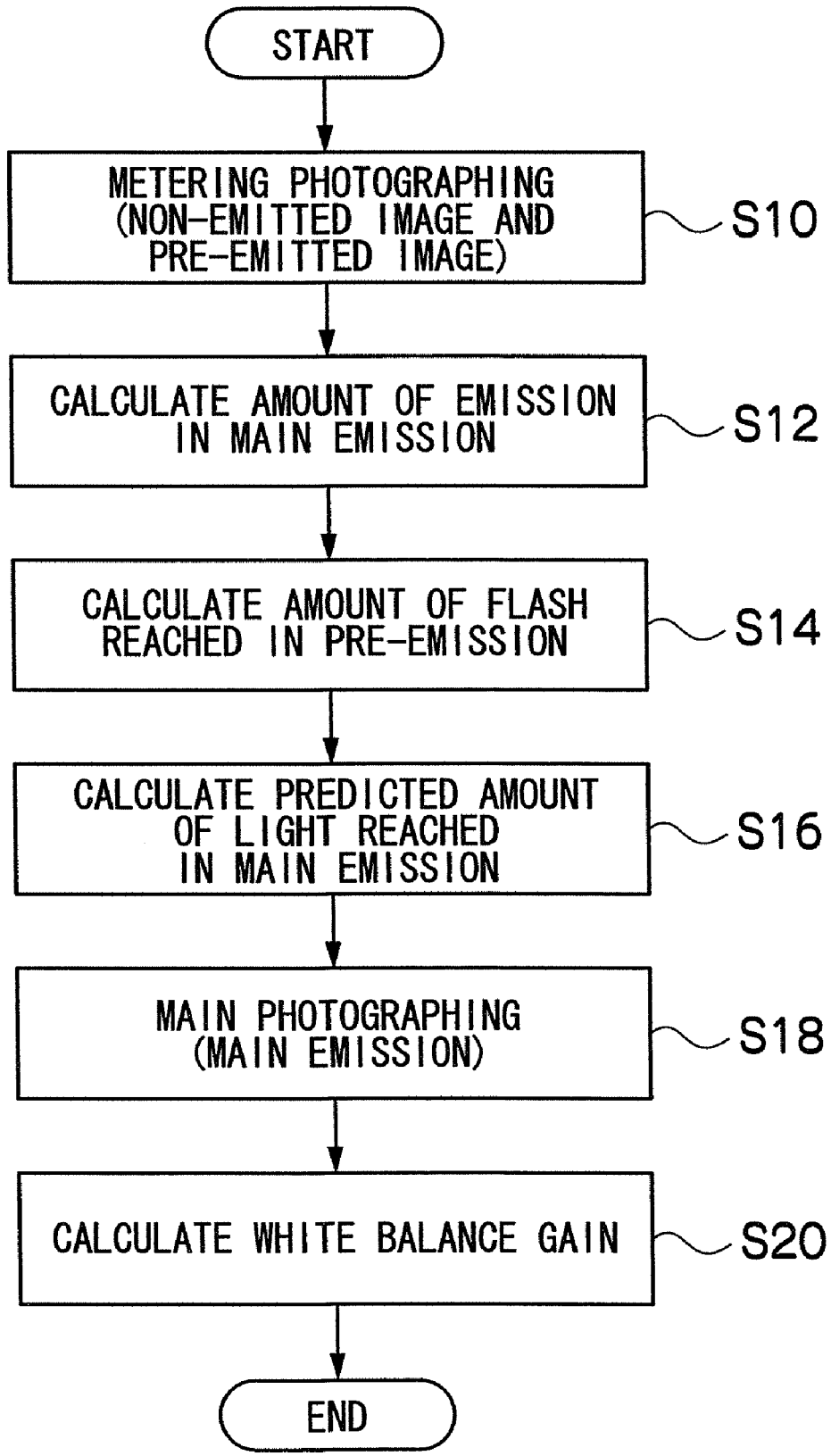
FIG. 3 is a flowchart showing the first embodiment of an image pick-up apparatus according to the present invention.

FIG. 3 is a flowchart indicating the first embodiment of the digital camera 10 according to the present invention, specifically showing calculation of the WB gain in the flash photographing.

In the figure, when the shutter button is pressed all the way down, the non-emitted image and the pre-emitted image for metering flash are photographed before the main photographing (switch S10). That is, the non-emitted image is captured without emitting the flash device 52 before the main photographing, and then the flash device 52 is caused to perform the pre-emission with a predetermined amount of emission and the image is photographed, and the pre-emitted image photographed in the pre-emission is captured. The non-emitted image and the pre-emitted image may be photographed in the reverse order.

Then, an amount of emission calculating circuit 25A in the metering unit 25 shown in FIG. 2 calculates the amount of emission in the main emission required for photographing the main subject such as a person based on the non-emission image and the pre-emitted image at the target brightness value (switch S12).

Figure 4:
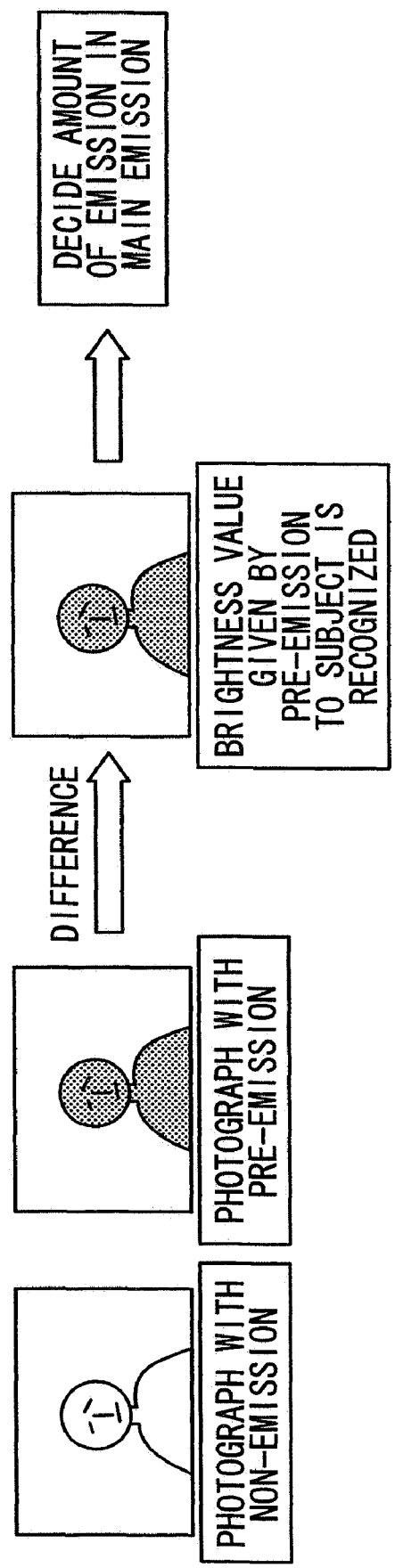
FIG. 4 is a schematic diagram of metering by an image pick-up element.

That is, a difference between the brightness values of the non-emitted image and the pre-emitted image is obtained as shown in FIG. 4 and the brightness value given by the amount of emission in the pre-emission to the main subject is calculated. Here, the target brightness value Ea, the brightness value $E_1$ of the non-emitted image, and the brightness value Em given by the amount of emission in the main emission to the main subject have relation shown below.

$$Ea = E_1 + Em \quad \text{[Formula 1]}$$

In the formula 1, the target brightness value Ea is a fixed value, the brightness value $E_1$ of the non-emitted image can be calculated from the non-emitted image. Accordingly, from those values, the brightness value Em that is given by the amount of emission in the main emission to the main subject can be obtained.

Assuming that the brightness value given by the amount of emission in the pre-emission obtained by comparing the non-emitted image and the pre-emitted image to the main subject is PE, the amount of the main emission, the amount of pre-emission, the brightness value PE and the brightness value Em have relationship shown below.

the amount of emission in the main emission:the
amount of emission in the pre-emission=$Em:PE$ the amount of emission in the main emission=the
amount of emission in the pre-emission×$(Em/PE)$ [Formula 2]

Therefore, according to the formula 2, the amount of emission in the main emission required for photographing the main subject at the target brightness value can be calculated.

Then, the amount of flash reached calculating circuit 25B (see FIG. 2) calculates the amount of flash reached in the pre-emission based on the brightness value PE given by the amount of emission in the pre-emission to the main subject (step 14).

Here, the amount of flash reached in the pre-emission, which indicates a ratio of the brightness value PE to the target brightness value, can be represented by the formula below, where PEv is the amount of flash reached.

$$PEv = PE/\text{target brightness value} \quad \text{[Formula 3]}$$

That is, the amount of flash reached in the pre-emission PEv shows a proportion of the amount of emission in the pre-emission contributing to the target brightness value.

Next, the predicted amount of light reached calculating circuit 25C (see FIG. 2) calculates the predicted amount of light reached that shows a proportion of the brightness value given by the amount of emission in the main emission to the main subject calculated at step S12 (step S16).

The predicted amount of light reached can be calculated according to the formula below based on the amount of emission in the pre-emission (fixed value), the amount of emission in the main emission calculated by the amount of emission calculating circuit 25A, and the amount of flash reached PEv calculated by the amount of flash reached calculating circuit 25B.

$$\text{the predicted amount of light reached} = PEv \times \Delta Ev \quad \text{[Formula 4]}$$

Here, ΔEv=the amount of emission in the main emission/the amount of emission in the pre-emission Next, the flash photographing (main photographing) is performed and the main emitted image is captured (step S18). The flash light emitted from the flash device 52 is metered so that the flash light becomes the amount of emission in the main emission calculated at step 12.

The WB gain calculating circuit 24I shown in FIG. 2 calculates the WB gains Rg, Gg, Bg for WB correction on the main emitted image based on the R, G and B signals of the main emitted image photographed in the abovementioned manner and the predicted amount of light reached input from the predicted amount of light reached calculating circuit 25C (step S18).

A method for calculating the WB gains Rg, Gg, Bg by the WB gain calculating circuit 24I will be described in detail.

First, the WB gains Rg1, Gg1, Bg1 for the main emitted image photographed under the mixed light of the ambient light and the flash light are calculated. That is, an average integrated value for each color of RGB signals is calculated for each of the 64 divided areas, which is a screen divided into 8×8, with the R, G, B signals for the main emitted image used, and a ratio of the average integrated value of R, G and B (i.e., a ratio of R/G and B/G) is calculated for each of the divided areas.

Color information on each of the 64 divided areas calculated in the abovementioned manner can be represented by 64 points distributed on color spaces of R/G, B/G based on the value of the R/G, B/G.

Then, the position of a representative point of a group of the abovementioned points crowded on the color spaces of R/G, B/G (a barycentric position or an average position) is considered as color information on the mixed light of the ambient light and the flash light. The WB gain Rg1 for an R signal and the WB gain Gg1 for a B signal for making the color information of the representative pint neutral grey (N grey) are calculated.

In the embodiment, the WB gain Gg1 for the G signal is assumed to be a fixed value. A method for calculating the WB gain is not limited to those described above and such method as described in Japanese Patent Application Laid-Open No. 2003-283918, Japanese Patent Application Laid-Open No. 2003-309854, Japanese Patent Application Laid-Open No. 11-25523, Japanese Patent Application Laid-Open No. 2006-222672 or the like may be applied.

In the WB gain calculating circuit 24I, the gain WB gains Rg2, Gg2 and Bg2 which can previously perform the appropriate WB correction corresponding to the color of the light source of the flash light (usually, a daylight color) are set. The WB gain calculating circuit 24I performs weighing-adding on the WB gain Rg1, Gg1, Bg1 calculated for the main emitted image and the WB gain Rg2, Gg2, Bg2 set for the flash light according to the predicted amount of light reached input from the predicted amount of light reached calculating circuit 25C, and calculates the final WB gains Rg, Gg, Bg for performing the WB correction on the main emitted image.

Figure 5:
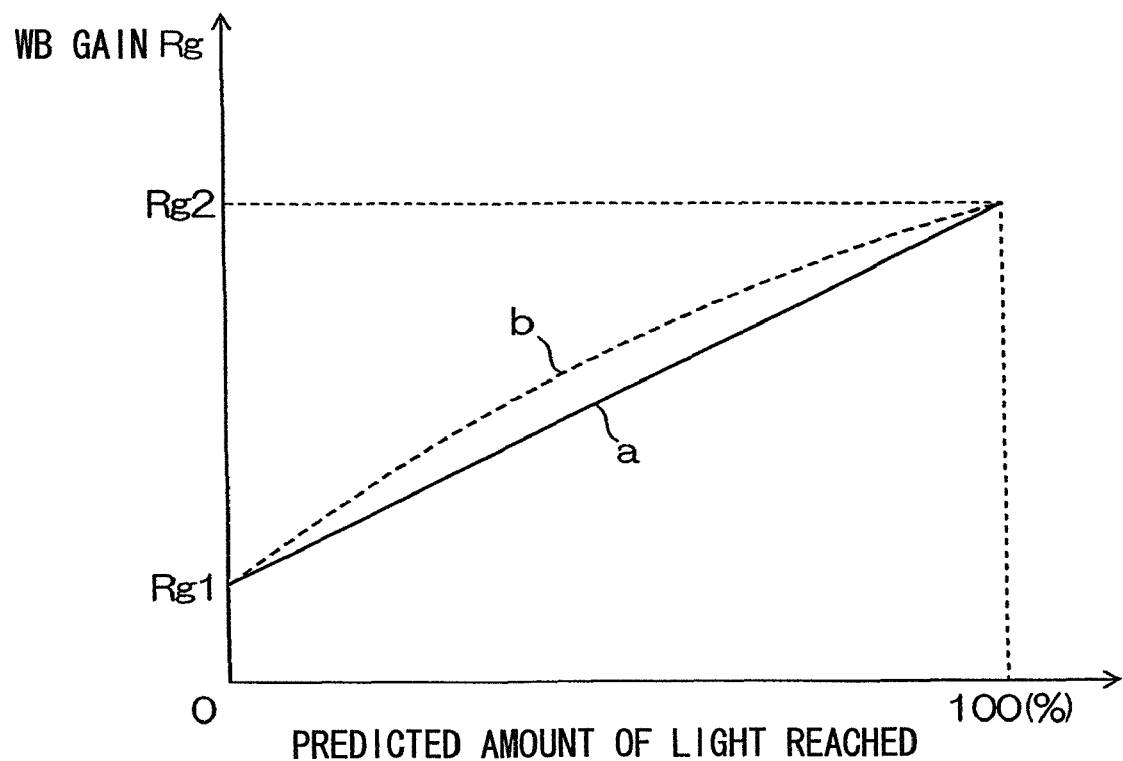
FIG. 5 is a graph used for illustrating a method for calculating the WB gain.

FIG. 5 shows an example of a method for calculating the WB gain Rg for the R signal with the horizontal axis of FIG. 5 indicating the predicted amount of light reached and the longitudinal axis indicating the WB gain Rg.

As shown in the graph, when the predicted amount of light reached is 0%, the WB gain Rg is the WB gain Rg1 that is calculated as the main emitted image is analyzed. As the predicted amount of light reached increases, the WB gain Rg increases from the WB gain Rg1 toward the WB gain Rg2. When the predicted amount of light reached is 100%, the WB gain Rg is the WB gain Rg2 that is set for the flash light.

The WB gain Rg may be calculated so that it changes along the line "a" according to the predicted amount of light reached. The WB gain Rg may also be calculated so that it changes along the mountain-shaped convex curve "b" drawn by dotted line.

The WB gain Bg for the B signal can be calculated in the same manner except for calculating the WB gain Rg so that it changes along the mountain-shaped convex curb "b" drawn by dotted line. In such a case, the WB gain Bg is calculated so that it changes along the valley-shaped convex curve (a change curve from the WB gain Bg1 to the WB gain Bg2).

Now, a reason for changing the WB gains Rg and Bg along a curve according to the predicted amount of light reached as mentioned above will be described.

Figure 6:
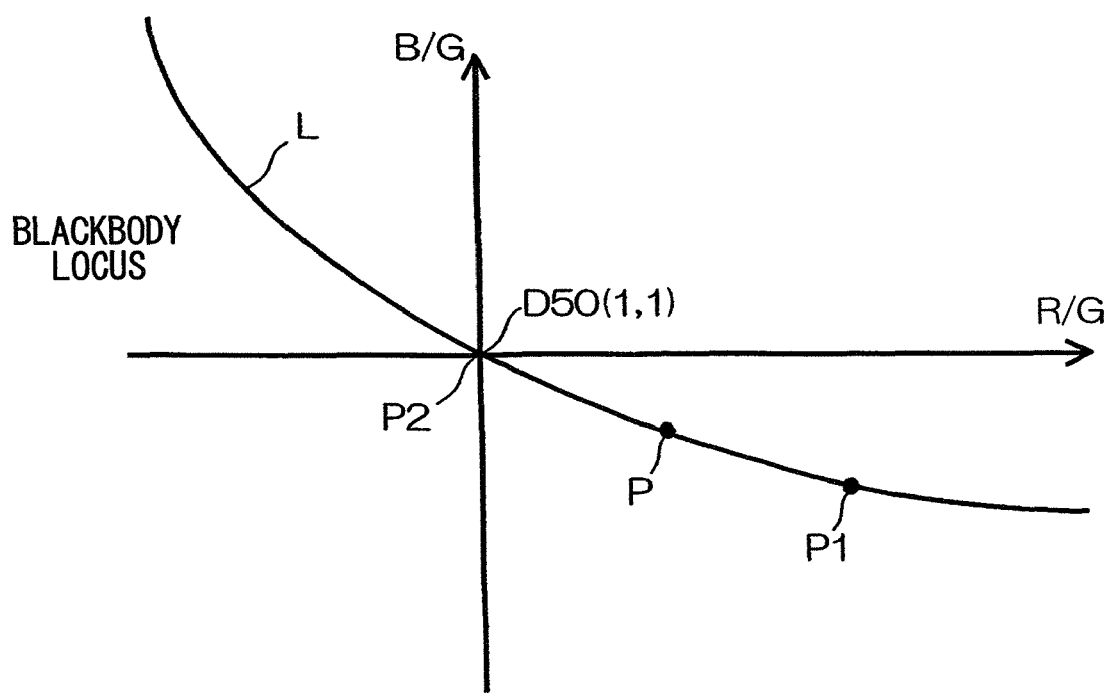
FIG. 6 is a graph showing a Blackbody locus on the R/G, B/G color spaces.

FIG. 6 is a graph showing a Blackbody locus L on the R/G, B/G color spaces. The Blackbody locus L is a locus of blackbody in color change when the color temperature of the light source is changed. The Blackbody locus L passes the reference point D50 (1, 1) on the R/G, B/G color spaces.

Assuming that a representative point of the main emitted image on the R/G, B/G color spaces calculated based on the main emitted image is a point P1 on the Blackbody locus L. The color temperature of the flash light corresponds to a point P2 on the Blackbody locus L (=reference point D50). If the representative point indicating color information of the main emitted image is deviated from the Blackbody locus L, the representative point is moved onto the nearest Blackbody locus L. As the representative point is moved onto the Blackbody locus L in such a manner, the effect of the color of the material in the color information on the main emitted image is reduced so that the color of the light source can be obtained based on color information with reduced effect of the color of the material.

Then, the point P for calculating the final WB gains Rg, Gg, Bg is decided so that the point P is moved on the Blackbody locus L between the point P1 and the point P2 according to the predicted amount of light reached. As shown in FIG. 6, the Blackbody locus L is a curve on the R/G, B/G color spaces. If the WB gains Rg, Gg, Bg are to be decided based on the points along the Blackbody locus L, the WB gains Rg, Bg also change in a shape of curve as shown in FIG. 5.

The gain correcting circuit 24B shown in FIG. 2 performs white balance correction by inputting the WB gains Rg, Gg, Bg for each of the R, G and B signals calculated in the abovementioned manner from the WB gain calculating circuit 24I and performing gain correction on the R, G and B signals input from the offset correcting circuit 2A in the order of points by the WB gains Rg, Gg, Bg for each of the R, G and B signals.

As the gain correcting circuit 24B is adapted to predict the amount of flash reached which is the amount of flash reaching the main subject in such a manner and perform the white balance correction according to the predicted amount of light reached, it can appropriately perform the white balance correction on the main subject even if the mix light of the flash light and the ambient light is radiated on the main subject.

Although the embodiment is adopted to obtain the WB gains Rg1, Gg1, Bg1 from the main emitted image, on which a mixed light of the flash light and the ambient light is radiated on the main subject, the present invention is not limited to that and may be adapted to obtain the WB gains Rg1, Gg1, Bg1 from the non-emitted image, on which only the ambient light is radiated on the main subject.

Second Embodiment

Figure 7:
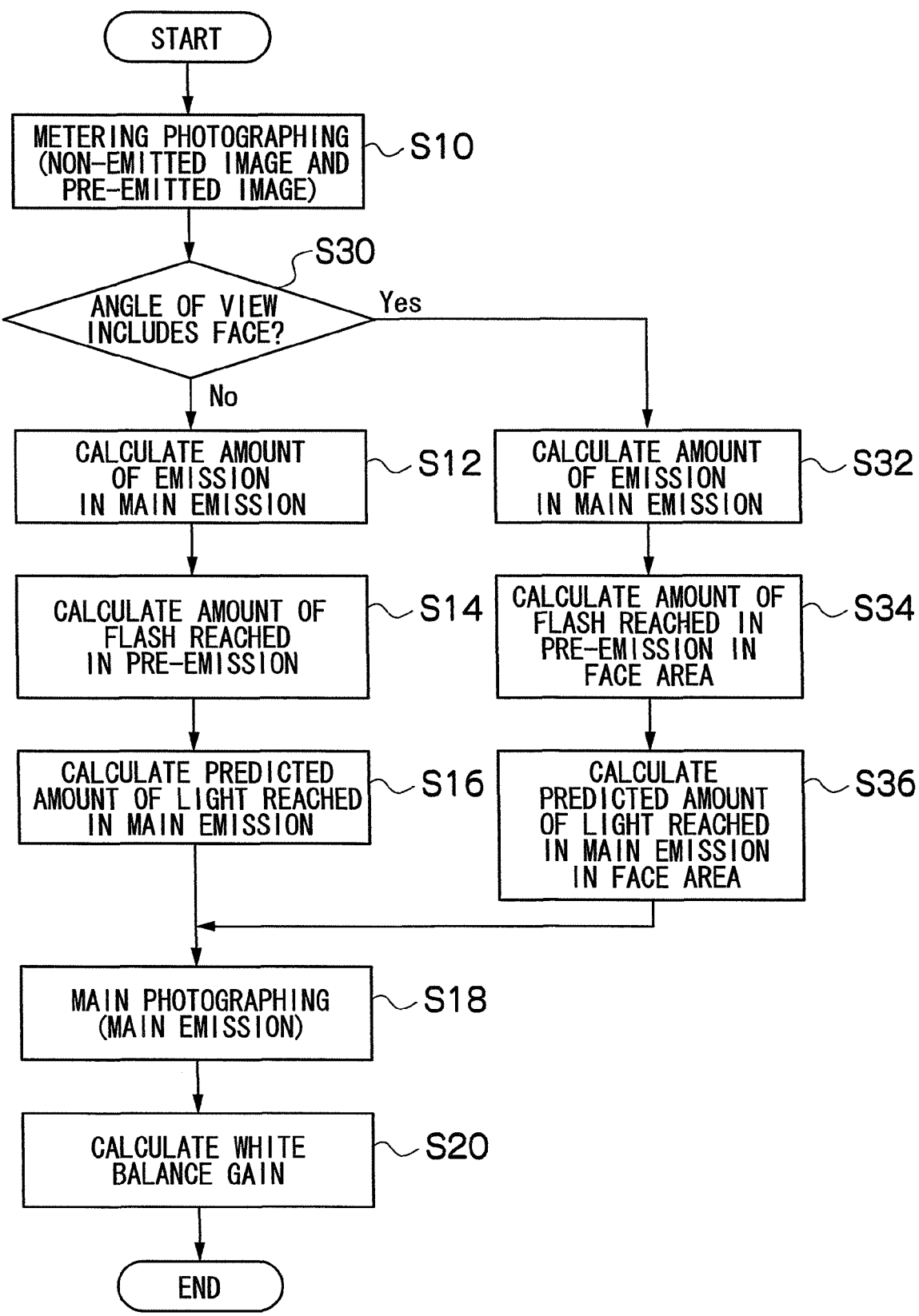
FIG. 7 is a flowchart showing a second embodiment of the image pick-up apparatus according to the present invention.

FIG. 7 is a flowchart showing a second embodiment of the digital camera 10 according to the present invention. The same parts as those in the first embodiment shown in FIG. 3 are designated by the same step numbers and omitted from the detailed description.

The second embodiment is for processing a human face as a main subject when the face is detected. As shown in FIG. 7, the second embodiment is the first embodiment with processing of the steps S30, S32 and S34 added.

At step S30, whether the angle of view of each of the non-emitted image and the pre-emitted image photographed at step S10 includes a face or not is determined. If no face is included, the operation proceeds to step S12, where the same processing as that in the first embodiment is performed. If a face is included, the operation proceeds to step S32.

At step S32, the amount of emission in the main emission required for photographing the main subject at the target brightness value is calculated based on the non-emitted image and the pre-emitted image as at step S12. Here, the amount of emission in the main emission is calculated by limiting the main subject to the face area.

Figure 8:
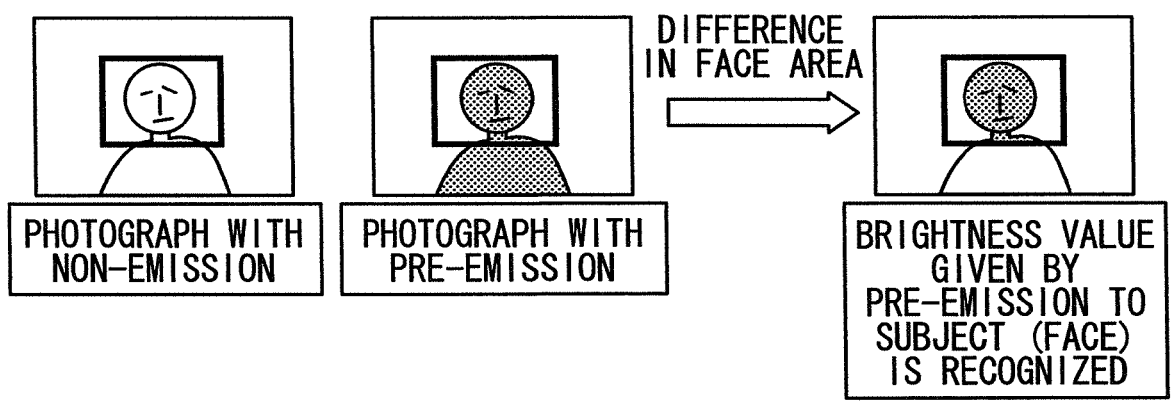
FIG. 8 is a diagram used for illustrating a method for calculating affection (brightness value) given by the pre-emission to the main subject (face)

That is, the face detecting unit 49 of the digital camera 10 detects a face area from an image of either the non-emitted image or the pre-emitted image (preferably, the pre-emitted image). At step S32, images of the face area are extracted from the non-emitted image and the pre-emitted image respectively as shown in FIG. 8 based on information on the face area detected by the face detecting unit 49, a difference among the respective brightness values of the images of the face area is obtained, and the brightness value given by the amount of emission in the pre-emission to the main subject (face) is calculated.

Then, the amount of emission in the main emission required for photographing the main subject (face) at the target brightness value is calculated by the abovementioned [Formula 1] and [Formula 2] based on the brightness value given by the calculated amount of emission in the pre-emission to the main subject (face).

Next, the amount of flash reached in the pre-emission is calculated by the abovementioned [Formula 3] based on the brightness value given by the amount of emission in the pre-emission to the main subject (face) (step 34).

Then, the predicted amount of light reached indicating a proportion of the brightness value given by the amount of emission in the main emission calculated for the brightness value at step S32 to the main subject (face) is calculated (step S36). The predicted amount of light reached can be calculated by the abovementioned [Formula 4] based on the amount of emission in the pre-emission (fixed value), the amount of emission in the main emission calculated at step S32, and the amount of flash reached calculated at step S34.

If the angle of view includes a face, the predicted amount of light reached is calculated for the face, and the WB gains Rg, Gg, Bg for performing the WB correction on the main emitted image is calculated based on the predicted amount of light reached. Accordingly, the white balance correction is appropriately performed on the face area of the main emitted image.

Figure 9:
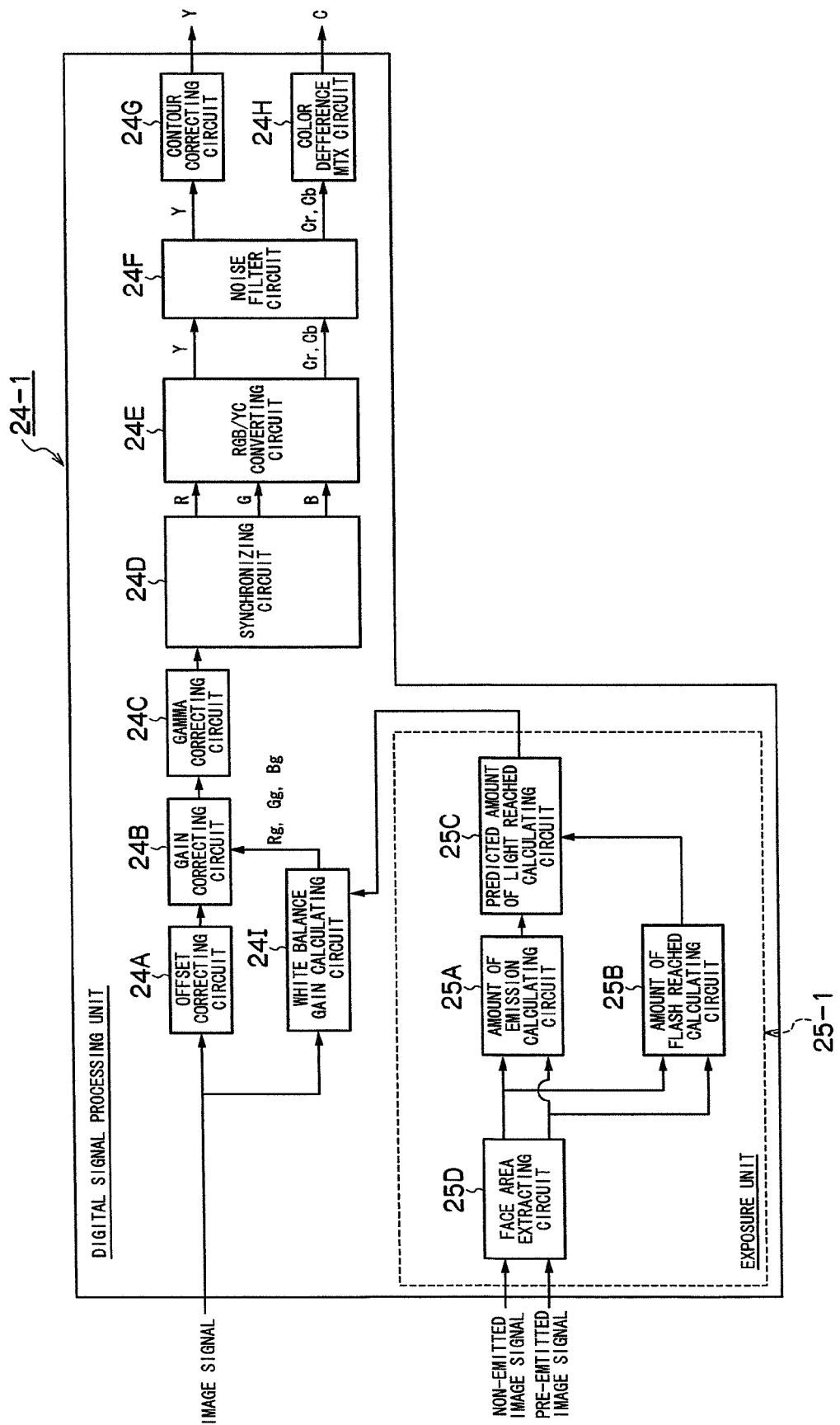
FIG. 9 is a block diagram showing the second embodiment of the digital signal processing unit shown in FIG. 1.

FIG. 9 is a block diagram showing details of the digital signal processing unit 24-1 corresponding to the second embodiment. In FIG. 9, the same parts as those in the digital signal processing unit 24 of the first embodiment shown in FIG. 2 are designated by the same alphanumeric characters and omitted from the detailed description.

The second embodiment has the metering unit 25-1 in the digital signal processing unit 24-1 with the face area extracting circuit 25D added. If a face is detected by the face detecting unit 49 (FIG. 1), the face area extracting circuit 25D outputs only images corresponding to the face areas in the non-emitted image and the pre-emitted image to the amount of emission calculating circuit 25A and the amount of flash reached calculating circuit 25B in the latter stage based on information on the face area from the face detecting unit 49. If a face is not detected, the face area extracting circuit 25D outputs the entire images of the non-emitted image and the pre-emitted image to the amount of emission calculating circuit 25A and the amount of flash reached calculating circuit 25B respectively.

Third Embodiment

Figure 10:
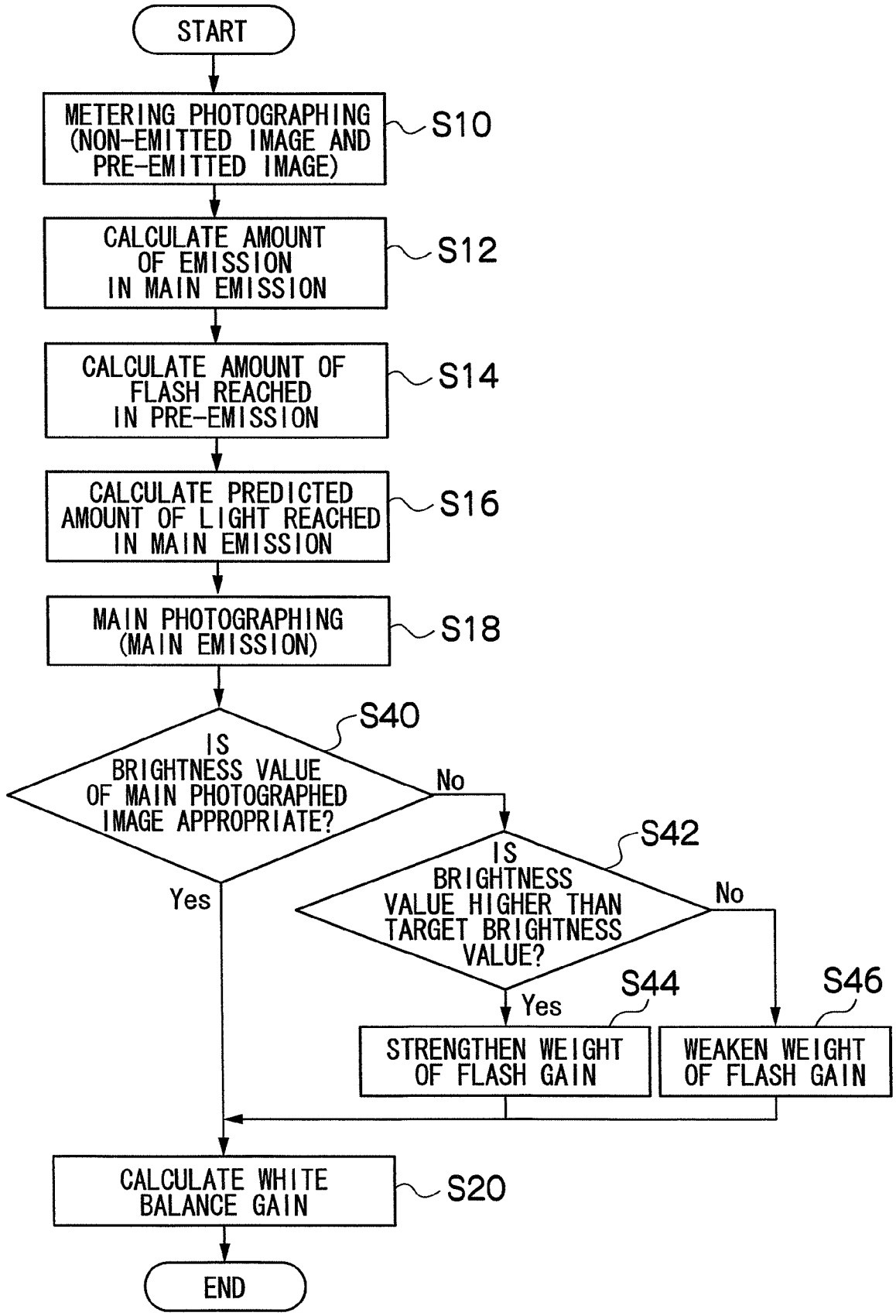
FIG. 10 is a flowchart showing a third embodiment of the image pick-up apparatus according to the present invention.

FIG. 10 is a flowchart showing the third embodiment of the digital camera 10 according to the present invention. The same parts as those in the first embodiment shown in FIG. 3 are designated by the same step numbers and omitted from the detailed description.

The third embodiment is for preventing the variation in the amount of emission in the main emission from affecting calculation of the WB gain (white balance correction). As shown in FIG. 10, the third embodiment is the first embodiment with processing at steps S40, S42, S44 and S46 added.

At step S40, the brightness value is calculated from the main emitted image obtained at the flash photographing (main photographing) and whether the brightness value is appropriate (target brightness value) or not is determined. If the target brightness value is matched, the operation proceeds to step S20 as in the first embodiment. If the target brightness value is not matched, the amount of emission in the main emission is considered to have variation and the operation proceeds to step S42.

At step S42, whether the brightness value of the main emitted image is higher than the target brightness value or not is determined. If the brightness value is higher than the target brightness value, the operation proceeds to step S44. If the brightness value is lower than the target brightness value, the operation proceeds to step S46.

If the brightness value in the main emitted image is higher than the target brightness value, the amount of emission in the main emission is considered too big due to variation in the amount of emission in the main emission and the WB gain is set so that the weight of the WB gain (flash gain) set for the flash light becomes big (step S44). That is, at step S20, the WB gain is calculated based on the predicted amount of light reached. Here, the predicted amount of light reached is made bigger than the value calculated at step S16.

If the brightness value in the main emitted image is lower than the target brightness value, the amount of emission in the main emission is considered too small due to variation in the amount of emission in the main emission and the WB gain is set so that the weight of the WB gain (flash gain) set for the flash light becomes small (step S46).

Figure 11:
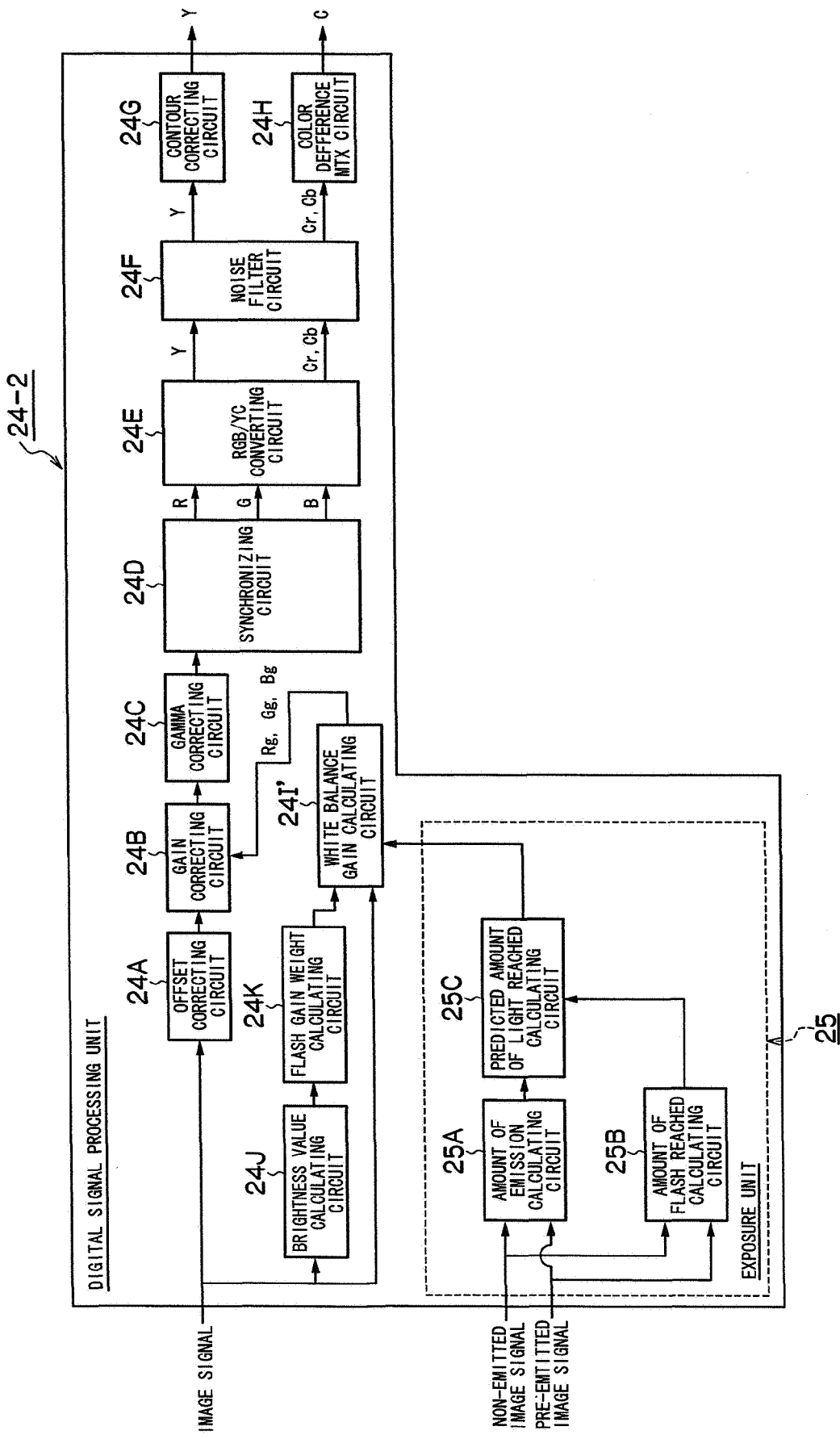
FIG. 11 is a block diagram showing the third embodiment of the digital signal processing unit shown in FIG. 1.

FIG. 11 is a block diagram showing details of the digital signal processing unit 24-2 corresponding to the third embodiment. The same parts as those in the digital signal processing unit 24 of the first embodiment shown in FIG. 2 are designated by the same alphanumeric characters and omitted from the detailed description.

The third embodiment has the digital signal processing unit 24-2 with a brightness value calculating circuit 24J and a flash gain weight calculating circuit 24K added and the WB gain calculating circuit 24I' changed.

That is, the brightness value calculating circuit 24J calculates the brightness value of the main emitted image and outputs the brightness value to the flash gain weight calculating circuit 24K. The flash gain weight calculating circuit 24K compares the calculated brightness value and the target brightness value, calculates the flash gain weighing factor according to the compared result and outputs the factor to the WB gain calculating circuit 24I'.

The WB gain calculating circuit 24I' corrects the predicted amount of light reached input from the predicted amount of light reached calculating circuit 25C of the metering unit 25 with the flash gain weighing factor and calculates the WB gains Rg, Gg, Bg based on the corrected predicted amount of light reached.

Fourth Embodiment

Figure 12:
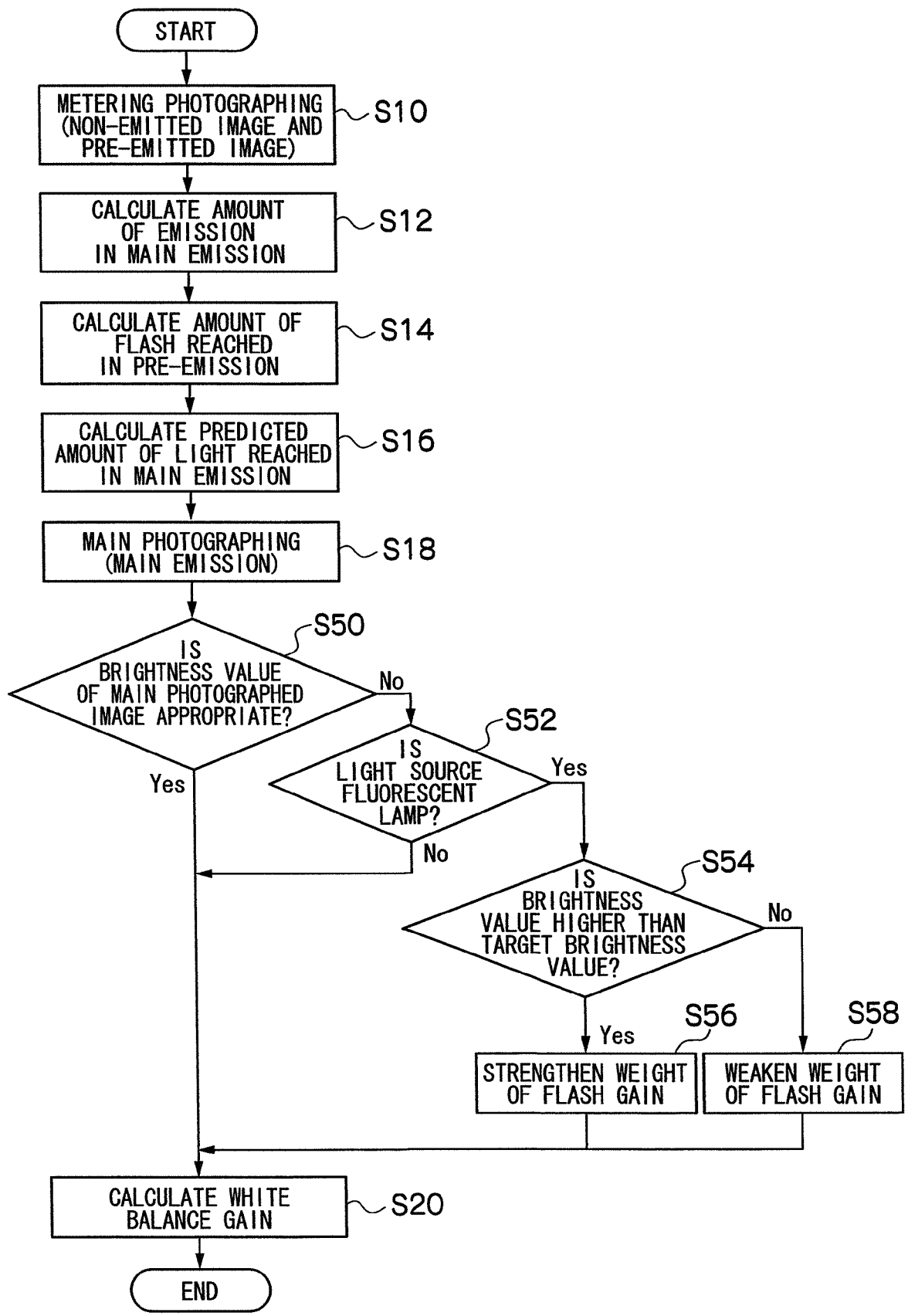
FIG. 12 is a flowchart showing a fourth embodiment of the image pick-up apparatus according to the present invention.

FIG. 12 is a flowchart showing the fourth embodiment of the digital camera 10 according to the present invention. The same parts as those in the first embodiment shown in FIG. 3 are designated by the same step numbers and omitted from the detailed description.

The fourth embodiment is for preventing the flicker of the fluorescent lamp from affecting the calculation of the WB gain (white balance correction). As shown in FIG. 10, the third embodiment is the first embodiment with the processing at steps S50, S52, S54, S56 and S58 added.

At step S50, the brightness value is calculated from the main emitted image obtained in the flash photographing (main photographing), and whether the brightness value is appropriate (target brightness value) or not is determined. If the brightness value matches the target brightness value, the operation proceeds to step S20 as in the first embodiment. If the brightness value does not match the target brightness value, the amount of emission in the main emission is considered not appropriate due to the affection of the flicker of the fluorescent lamp, and the operation proceeds to step S52. That is, the fluorescent lamp has flickers of 50 Hz or 60 Hz. The amount of emission in the main emission differs depending on whether the non-emitted image is photographed under the bright fluorescent lamp or dark fluorescent lamp.

At step S52, whether the type of light source of the non-emitted light (ambient light) is a fluorescent lamp or not is determined. If it is determined that the type of the light source of the ambient light is not a fluorescent lamp, the operation proceeds to step S20. If it is determined that it is a fluorescent lamp, the operation proceeds to step S54.

The determination on the type of the light source is performed in the manner below: A screen of the non-emitted image is divided into 8×8=64 divided areas, an average integrated value for each color of the RGB signals is calculated for each divided area, and ratios of the average integrated values for R, G, B (i.e., ratios of R/G and B/G) are calculated. The color information calculated in that manner for each of the 64 divided areas can be represented by 64 points distributed on the R/G, B/G color spaces based on the R/G, B/G values. Then, the position of the representative point of a group where the abovementioned points are crowded on the color spaces of R/G, B/G (a barycentric position or an average position) is considered as color information on the ambient light, and the type of light source of the ambient light is determined based on the color information.

At step S54, whether the brightness value of the main emitted image is higher than the target brightness value or not is determined. If it is determined that the brightness value is higher than the target brightness value, the operation proceeds to step S56. If it is determined that it is lower than the target brightness value, the operation proceeds to step S58.

If the brightness value of the main emitted image is higher than the target brightness value, it is determined that the non-emitted image is darker than the original brightness due to the affection of the flicker of the fluorescent lamp. Thus, the WB gain is set so that the weight of the WB gain (flash gain) set for the flash light becomes small (step S56). That is, at step S20, the WB gain is calculated based on the predicted amount of light reached. The predicted amount of light reached is made smaller than the value calculated at step S16.

If the brightness value of the main emitted image is lower than the target brightness value, it is determined that the non-emitted image is brighter than the original brightness due to the affection of the flicker of the fluorescent lamp, thus, the WB gain is set so that the weight of the WB gain (flash gain) set for the flash light becomes big (step S58).

Even with the variation in the amount of emission in the pre-emission of the fluorescent lamp, an appropriate white balance gain can be obtained as described above.

Figure 13:
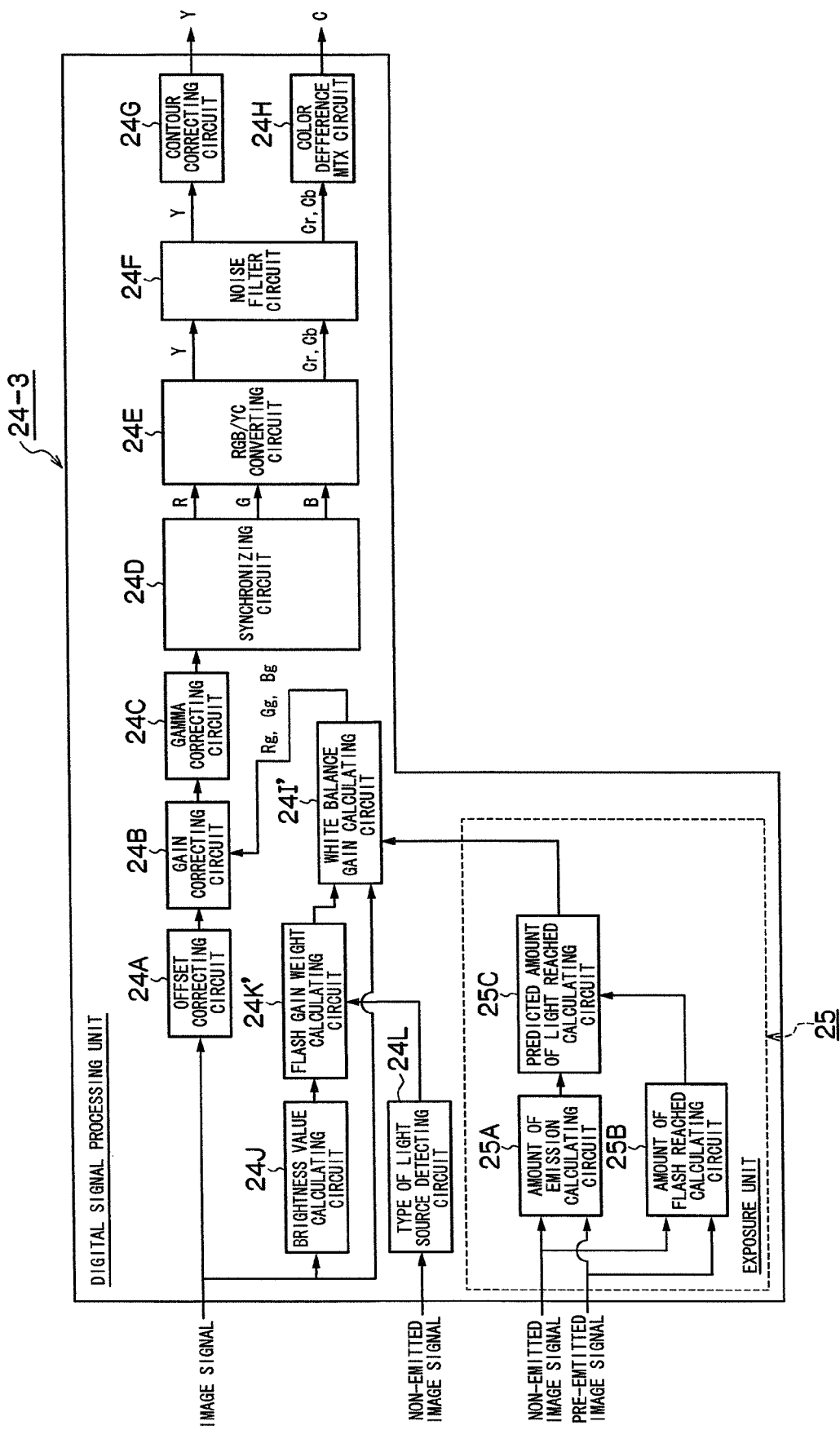
FIG. 13 is a block diagram showing the fourth embodiment of the digital signal processing unit shown in FIG. 1.

FIG. 13 is a block diagram showing details of the digital signal processing unit 24-3 corresponding to the fourth embodiment. In FIG. 13, the same parts as those in the digital signal processing unit 24-2 of the third embodiment shown in FIG. 11 are designated by the same alphanumeric characters and omitted from the detailed description.

The fourth embodiment has the digital signal processing unit 24-3 with a type of light source detecting circuit 24L added and the flash gain weight calculating circuit 24K' changed.

That is, the type of light source detection 24L detects the type of light source of the non-emitted image based on the non-emitted image as mentioned above. If the detected type of light source is a fluorescent lamp, the type of light source detection 24 outputs the detected result to the flash gain weight calculating circuit 24K'.

The flash gain weight calculating circuit 24K' compares the brightness value of the main emitted image calculated at the brightness value calculating circuit 24J and the target brightness value, calculates the flash gain weight coefficient according to the compared result and the detected result of the type of the light source, and outputs the factor to the WB gain calculating circuit 24I'. Specifically, if the type of the light source is a fluorescent lamp and the brightness value of the main emitted image is higher than the target brightness value, the flash gain weight calculating circuit 24K' calculates the flash gain weighing factor for weakening the weight of the flash gain. If the brightness value of the main emitted image is lower than the target brightness value, the flash gain weight calculating circuit 24K' calculates the flash gain weighing factor for strengthening the weight of the flash gain.

The WB gain calculating circuit 24I' corrects the predicted amount of light reached input from the predicted amount of light reached calculating circuit 25C of the metering unit 25 by the flash gain weighing factor, and calculates the WB gains Rg, Gg, Bg based on the corrected predicted amount of light reached.

Fifth Embodiment

Figure 14:
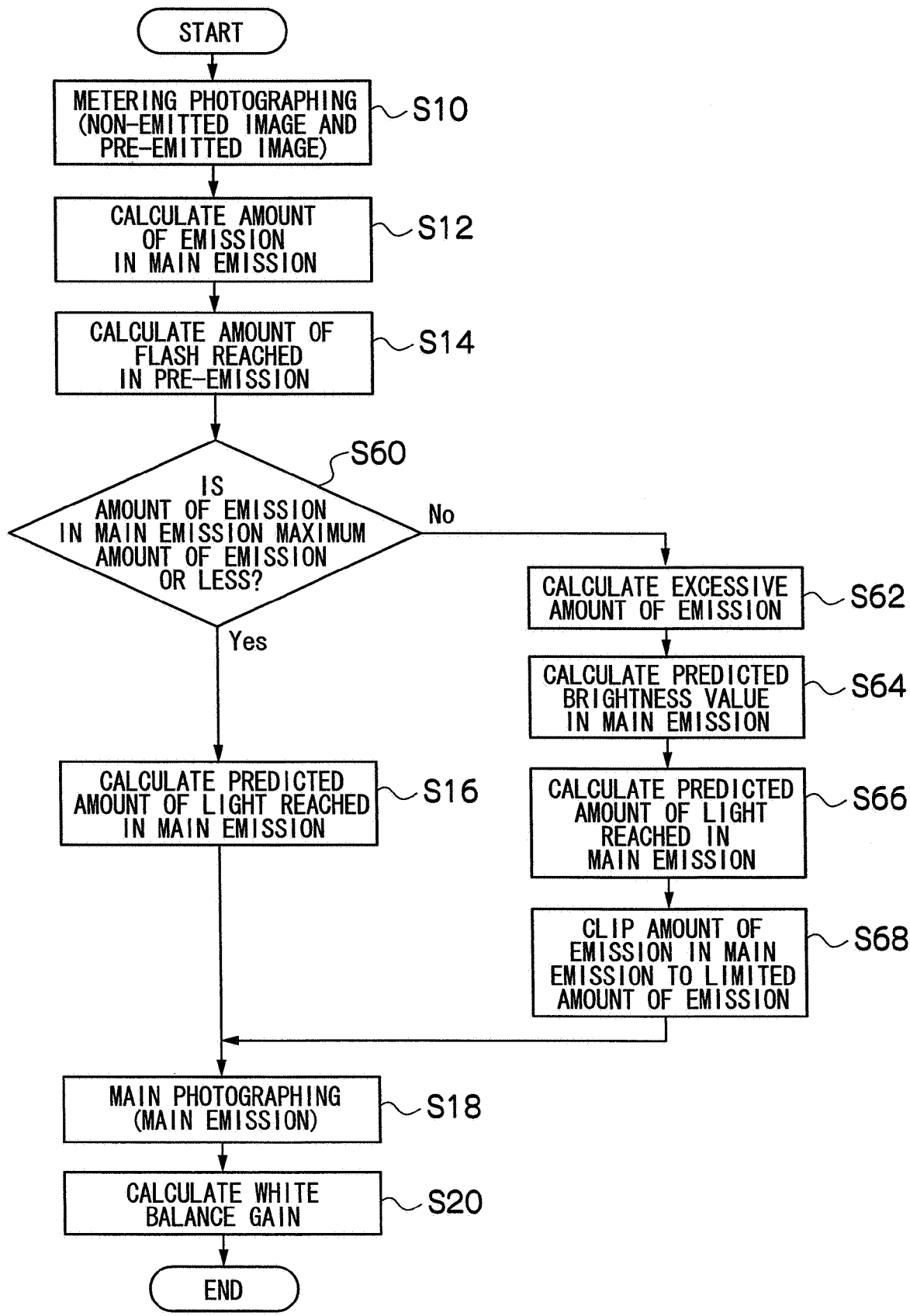
FIG. 14 is a flowchart showing a fifth embodiment of the image pick-up apparatus according to the present invention.

FIG. 14 is a flowchart showing the fifth embodiment of the digital camera 10 according to the present invention. The same parts as those in the first embodiment shown in FIG. 3 are designated by the same step numbers and omitted from the detailed description.

The fifth embodiment is for performing the appropriate white balance correction even if the brightness value of the main emitted image does not reach the target brightness value due to the affection of the maximum amount of emission from the flash device 52. As shown in FIG. 14, the fifth embodiment is the first embodiment with the processing at steps S60, S62, S64, S66 and S68 added.

At step S60, whether the amount of emission in the main emission calculated at step S12 is the maximum amount of emission from the flash device 52 or less or not is determined. If the amount of emission of the main emission is the maximum amount of emission or less, the operation proceeds to step S16 as in the first embodiment. If the amount of emission in the main emission exceeds the maximum amount of emission, the operation proceeds to step S62.

At step S62, the excessive amount of emission is calculated by subtracting the maximum amount of emission from the amount of emission of the main emission.

Then, the predicted brightness value of the main emitted image in the flash photographing (main photographing) is calculated by the formula below based on the excessive amount of emission and the like (step S64).

Predicted brightness value=target brightness value−
PEv×(ΔEv−ΔEv max), where PEv:the amount of
flash reached in the pre-emission (see [Formula 3])

ΔEv=amount of emission in the main emission/
amount of emission in the pre-emission ΔEv$_{max}$=the maximum amount of emission/the
amount of emission in the pre-emission  [Formula 5]

Next, the predicted amount of light reached indicating a proportion of the brightness value given by the amount of main emission in the main emission calculated at step S64 (maximum amount of emission) to the main subject is calculated by the formula below (step S66).

Predicted amount of light reached=$PEv'$×$\Delta Ev_{max}$,  [Formula 6]

where PEv'=PEv/predicted brightness value (PEv:the amount of flash reached in the pre-emission)

At step 68, the amount of emission from the flash device 52 is clipped to the maximum amount of emission instead of the amount of emission calculated at step 12.

At step 20, the WB gain is calculated based on the predicted amount of light reached. If the amount of emission in the main emission is the maximum amount of emission or less, the predicted amount of light reached calculated at step S16 is used. If the amount of emission in the main emission exceeds the maximum amount of emission, the predicted amount of light reached calculated at step S66 is used.

Accordingly, the embodiment can perform the appropriate white balance correction as it is adapted to correctly calculate the predicted amount of light reached and calculate the WB gain based on the predicted amount of light reached even if the amount of emission in the main emission exceeds the maximum amount of emission and the brightness value in the main emission falls short of the target brightness value.

Although the fifth embodiment is adapted to calculate the predicted brightness value by [Formula 5], the brightness value may be calculated from the main emitted image and the brightness value (measured brightness value) may be used instead of the predicted brightness value.

What is claimed is:

1. A white balance correcting method comprising the steps of:
   causing a flash emission device to perform pre-emission with a predetermined amount of emission prior to flash photographing and capturing a pre-emitted image picked up in the pre-emission;
   capturing a non-emitted image picked up in the non-emission prior to the flash photographing;
   calculating a brightness value given by the amount of emission in the pre-emission to a main subject by comparing the pre-emitted image and the non-emitted image;
   calculating an amount of flash reached, which indicates a proportion of the brightness value given by the amount of emission in the pre-emission to the main subject, to a target brightness value based on the brightness value given by the calculated amount of emission in the pre-emission to the main subject;
   calculating an amount of emission in the main emission required for photographing the main subject at the target brightness value based on the captured pre-emitted image and non-emitted image;
   causing the flash emission device to perform the main emission by the calculated amount of emission in the flash photographing and capturing the main emitted image;
   calculating a predicted amount of light reached, which indicates a proportion of the brightness value given by the amount of emission in the main emission to the main subject, to a target brightness value by multiplying the calculated amount of flash reached in the pre-emission by a ratio of the calculated amount of emission in the main emission to the amount of emission in the pre-emission;
   performing white balance correction on the main emitted image obtained in the flash photographing based on the calculated predicted amount of light reached; and wherein
   the step of performing white balance correction includes:
   a step of calculating a white balance gain that is obtained by performing weighing-adding on a first white balance gain decided for each color of R, G, B based on the main emitted image obtained in the flash photographing or ambient light around the subject and a second white balance gain preset for each color of R, G, B corresponding to the light source color of the flash according to the calculated predicted amount of light reached; and
   a step for performing gain correction on R, G, B signals, which represent the main emitted image obtained in the flash photographing based on the calculated white balance gain.

2. The white balance correcting method according to claim 1, further comprising the step of detecting a face from the non-emitted image or the pre-emitted image, wherein
   the step of calculating a brightness value that is given by the amount of emission in the pre-emission to the main subject calculates the brightness value by comparing a non-emitted image and a pre-emitted image in a face area including a detected face when the face is detected in the non-emitted image or the pre-emitted image.

3. The white balance correcting method according to claim 1, comprising the step of detecting the brightness value of the main emitted image obtained in the flash photographing, wherein
   the step of calculating the white balance gain calculates the white balance gain by increasing the weight of the second white balance gain to be bigger than the weight decided in accordance with the calculated predicted amount of light reached when the brightness value of the detected main emitted image is bigger than the target brightness value; and calculates the white balance gain by decreasing the weight of the second white balance gain to be smaller than the weight decided in accordance with the calculated predicted amount of light reached when the brightness value of the detected main emitted image is smaller than the target brightness value.

4. The white balance correcting method according to claim 1, comprising the steps of:
   detecting the brightness value of the main emitted image obtained in the flash photographing; and
   detecting a light source type of the ambient light around the subject, wherein
   the step of calculating the white balance gain calculates the white balance gain by decreasing the weight of the second white balance gain to be smaller than the weight decided in accordance with the calculated predicted amount of light reached when the detected light source is a fluorescent lamp and the brightness value of the detected main emitted image is bigger than the target brightness value; and calculates the white balance gain by increasing the weight of the second white balance gain to be bigger than the weight decided in accordance with the calculated predicted amount of light reached when the detected brightness value of the main emitted image is smaller than the target brightness value.

5. The white balance correcting method according to claim 1, wherein
   the step of capturing the main emitted image captures the main emitted image by limiting the amount of emission from the flash to the maximum amount of emission in flash photographing when the calculated amount of emission exceeds the maximum amount of emission from the flash emission device, and
   the step of calculating the predicted amount of light reached calculates the predicted amount of light reached that indicates a proportion of the brightness value given by the maximum amount of emission to the main subject to the predicted brightness value or the measured brightness value by using the predicted brightness value or the measured brightness value instead of the target brightness value when the calculated amount of emission in the main emission exceeds the maximum amount of emission from the flash emission device, wherein the predicted brightness value is predicted from an excess amount of emission that is the calculated amount of emission in the main emission exceeds the maximum amount of emission, and the measured brightness value is calculated from the main emitted image.

6. An image-pickup apparatus comprising:
   a flash emission device;
   an image-pickup device which picks up an image of a subject in non-emission and pre-emission and main emission;
   an image capturing device which causes the flash emission device to perform pre-emission with a predetermined amount of emission prior to flash photographing and captures a pre-emitted image picked up in the pre-emission and also captures a non-emitted image picked up in the non-emission;
   a brightness value calculating device which calculates brightness value given by the amount of emission in the pre-emission to the main subject by comparing the captured pre-emitted image and the non-emitted image;

an amount of flash reached calculating device which calculates the amount of flash reached, which indicates a proportion of the brightness value given by the amount of emission in the pre-emission to the main subject, to a target brightness value based on the brightness value given by the calculated amount of emission in the pre-emission to the main subject;

an amount of emission calculating device which calculates the amount of emission in the main emission required for photographing the main subject at the target brightness value based on the captured pre-emitted image and non-emitted image;

a flash metering device which adjusts the amount of emission from the flash device to bring the amount of emission to the amount of emission in the main emission calculated in the flash photographing;

a predicted amount of light reached calculating device which calculates a predicted amount of light reached, which indicates a proportion of the brightness value given by the amount of emission in the main emission to the main subject, to a target brightness value by multiplying the calculated amount of flash reached in the pre-emission by a ratio of the calculated amount of emission in the main emission to the amount of emission in the pre-emission;

a white balance correction device which performs white balance correction on the main emitted image obtained in the flash photographing based on the calculated predicted amount of light reached; and wherein the white balance correction device comprises:

a white balance gain calculating device which calculates a white balance gain that is obtained by performing weighing-adding on a first white balance gain decided for each color of R, G, B based on the main emitted image obtained in the flash photographing or ambient light around the subject and a second white balance gain preset for each color of R, G, B corresponding to the light source color of the flash according to the calculated predicted amount of light reached; and a gain correction device which performs gain correction on R, G, B signals, which represent the main emitted image obtained in the flash photographing based on the white balance gain calculated by the white balance gain calculating device.

7. The image-pickup apparatus according to claim 6, comprising:

a face detecting device which detects a face from the non-emitted image or the pre-emitted image, wherein the brightness value calculating device calculates the brightness value that is given by the amount of emission in the pre-emission to the main subject by comparing a pre-emitted image and a non-emitted image in a face area including a detected face when the face is detected by the face detecting device.

8. The image-pickup apparatus according to claim 6 comprising:

a brightness value detecting device which detects the brightness value of the main emitted image obtained in the flash photographing, wherein the white balance gain calculating device calculates the white balance gain by increasing the weight of the second white balance gain to be bigger than the weight decided in accordance with the calculated predicted amount of light reached when the brightness value of the detected main emitted image is bigger than the target brightness value, and calculates the white balance gain by decreasing the weight of the second white balance gain to be smaller than the weight decided in accordance with the calculated predicted amount of light reached when the brightness value of the detected main emitted image is smaller than the target brightness value.

9. The image-pickup apparatus according to claim 6 comprising:

a brightness value detecting device which detects the brightness value of the main emitted image obtained in the flash photographing; and a light source type detecting device which detects a light source type of the ambient light around the subject, wherein the white balance gain calculating device calculates the white balance gain by decreasing the weight of the second white balance gain to be smaller than the weight decided in accordance with the calculated predicted amount of light reached when the detected light source is a fluorescent lamp and the brightness value of the detected main emitted image is bigger than the target brightness value, and calculates the white balance gain by increasing the weight of the second white balance gain to be bigger than the weight decided in accordance with the calculated predicted amount of light reached when the detected brightness value of the main emitted image is smaller than the target brightness value.

10. The image-pickup apparatus according to claim 6, wherein the flash metering device adjusts the amount of flash emission to bring the amount of flash emission to the maximum amount of emission in the main emission when the amount of emission calculated by the amount of emission calculating device exceeds the maximum amount of emission from the flash emission device; and the predicted amount of light reached calculating device calculates the predicted amount of light reached, which indicates a proportion of the brightness value given by the maximum amount of emission to the main subject, to the predicted brightness value or the measured brightness value by using the predicted brightness value or the measured brightness value instead of the target brightness value when the amount of emission calculated by the amount of emission calculating device exceeds the maximum amount of emission from the flash emission device, wherein the predicted brightness value is predicted from an excess amount of emission that is the calculated amount of emission in the main emission exceeds the maximum amount of emission, and the measured brightness value is calculated from the main emitted image.

* * * * *